(12) United States Patent
Berzon et al.

(10) Patent No.: US 8,110,127 B2
(45) Date of Patent: Feb. 7, 2012

(54) PHOTOCHROMIC COATING EXHIBITING IMPROVED PERFORMANCE

(75) Inventors: Ronald Berzon, Saint Petersburg, FL (US); Leo Charles Collett, Dunedin, FL (US)

(73) Assignees: Essilor International (Compagnie Generale d'Optique), Charenton, Cedex (FR); Transitions Optical, Inc., Pinellas Park, FL (US)

(*) Notice: Subject to any disclaimer, the term of this patent is extended or adjusted under 35 U.S.C. 154(b) by 331 days.

(21) Appl. No.: 12/487,305

(22) Filed: Jun. 18, 2009

(65) Prior Publication Data

US 2009/0315199 A1    Dec. 24, 2009

Related U.S. Application Data

(63) Continuation-in-part of application No. 12/142,452, filed on Jun. 19, 2008.

(51) Int. Cl.
*G02B 5/23* (2006.01)

(52) U.S. Cl. ....... 252/586; 526/90; 526/230.5; 526/236; 526/319; 526/320; 526/321; 526/323.1; 526/328

(58) Field of Classification Search .............. 252/586; 526/90, 230.5, 236, 319, 320, 321, 323.1, 526/328
See application file for complete search history.

(56) References Cited

U.S. PATENT DOCUMENTS

| | | | |
|---|---|---|---|
| 4,166,043 A | 8/1979 | Uhlmann et al. |
| 4,198,334 A | 4/1980 | Rasberger |
| 4,367,170 A | 1/1983 | Uhlmann et al. |
| 4,637,698 A | 1/1987 | Kwak et al. |
| 4,685,783 A | 8/1987 | Heller et al. |
| 4,931,219 A | 6/1990 | Kwiatkowski et al. |
| 4,931,220 A | 6/1990 | Haynes et al. |
| 5,166,345 A | 11/1992 | Akashi et al. |
| 5,236,958 A | 8/1993 | Miyashita |
| 5,252,742 A | 10/1993 | Miyashita |
| 5,359,085 A | 10/1994 | Iwamoto et al. |
| 5,458,814 A | 10/1995 | Kumar et al. |
| 5,531,940 A | 7/1996 | Gupta et al. |
| 5,645,767 A | 7/1997 | Van Gemert |
| 5,656,206 A | 8/1997 | Knowles et al. |
| 5,658,501 A | 8/1997 | Kumar et al. |
| 5,698,141 A | 12/1997 | Kumar |
| 5,723,072 A | 3/1998 | Kumar |
| 5,821,287 A | 10/1998 | Hu et al. |

(Continued)

FOREIGN PATENT DOCUMENTS

DE    198 05 977 A1    8/1999

(Continued)

OTHER PUBLICATIONS

Akzo Nobel Polymer Chemicals, Trigonox 131, Dec. 2005, 3 pages.

(Continued)

*Primary Examiner* — David W Wu
*Assistant Examiner* — Vu A Nguyen
(74) *Attorney, Agent, or Firm* — Keusey & Associates, P.C.

(57) ABSTRACT

A photochromic coating exhibiting improved performance and photochromic lenses made using the coating. The coating has excellent photochromic darkening and fatigue properties. The coating formulation is made from a monomer blend having at least two different types of monomers. A metal salt catalyst is used along with an initiator. An antioxidant is used in combination with a hindered amine light stabilizer. The coating is suitable for use in an in-mold coating process.

12 Claims, 1 Drawing Sheet

U.S. PATENT DOCUMENTS

| | | | |
|---|---|---|---|
| 6,022,497 A | 2/2000 | Kumar | |
| 6,113,814 A | 9/2000 | Gemert et al. | |
| 6,153,126 A | 11/2000 | Kumar | |
| 6,187,444 B1 | 2/2001 | Bowles, III et al. | |
| 6,296,785 B1 | 10/2001 | Nelson et al. | |
| 6,340,766 B1 | 1/2002 | Lin | |
| 6,348,604 B1 | 2/2002 | Nelson et al. | |
| 6,353,102 B1 | 3/2002 | Kumar | |
| 6,555,028 B2 | 4/2003 | Walters et al. | |
| 6,639,039 B1 | 10/2003 | Fries et al. | |
| 6,998,072 B2 | 2/2006 | Welch et al. | |
| 7,036,932 B2 | 5/2006 | Boulineau et al. | |
| 7,189,456 B2 | 3/2007 | King | |
| 7,258,437 B2 | 8/2007 | King et al. | |
| 7,320,826 B2 | 1/2008 | Kumar et al. | |
| 7,342,112 B2 | 3/2008 | Kumar et al. | |
| 7,465,415 B2 | 12/2008 | Wang et al. | |
| 7,527,754 B2 | 5/2009 | Chopra | |
| 7,820,082 B2 * | 10/2010 | Berzon et al. | 264/1.8 |
| 2006/0228557 A1 | 10/2006 | Kim et al. | |
| 2007/0122626 A1 | 5/2007 | Qin et al. | |
| 2007/0138449 A1 | 6/2007 | Chopra et al. | |
| 2007/0138664 A1 | 6/2007 | Chen et al. | |
| 2007/0138665 A1 | 6/2007 | Chen et al. | |
| 2007/0138667 A1 | 6/2007 | Dang et al. | |
| 2008/0023138 A1 | 1/2008 | Zheng | |
| 2008/0103301 A1 | 5/2008 | Chopra et al. | |

FOREIGN PATENT DOCUMENTS

JP     2005199683 A     7/2005

OTHER PUBLICATIONS

Alfa Aesar, Benzyl acrylate, 1 page, Jan. 2006.
Ciba Specialty Chemicals, Inc., Irganox 1010, 2004, 2 pages.
Clariant, Sanduvor PR-31, Feb. 2005, 6 pages.
Cytec Surface Specialties, Ebecryl 284-N, Jun. 2006, 2 pages.
Cytec Surface Specialties, Ebecryl 1290, May 2006, 2 pages.
Cytec Surface Specialties, Ebecryl 8411, Aug. 2006, 2 pages.
King Industries Specialty Chemicals, K-Kat 348 Urethan Catalyst, Feb. 5, 2004, 2 pages.
Sartomer Company, Inc., CN965, Aug. 2003, 1 page.
Sartomer Company, Inc., SR399, Nov. 1998, 1 page.
Sartomer Company, Inc., SR506D, Dec. 1998, 1 page.
Signma-Aldrich, Hydroxypropyi methacrylate, Jan. 2006, 1 page.
Signma-Aldrich, Tin(II) 2-ethylhexanoate, Jan. 2006, 1 page.
Signma-Aldrich, Cobalt Naphthenate, Jan. 2006, 1 page.

* cited by examiner

PHOTOCHROMIC COATING EXHIBITING IMPROVED PERFORMANCE

CROSS-REFERENCE TO RELATED APPLICATIONS

This application is a continuation-in-part of co-pending U.S. patent application Ser. No. 12/142,452 filed on Jun. 19, 2009.

BACKGROUND OF THE INVENTION

1. Field of the Invention

The invention relates to a photochromic coating and to a method for making a photochromic polycarbonate lens using the coating. The coating will exhibit excellent photochromic darkening and fatigue properties.

2. The Prior Art

Injection molded polycarbonate ophthalmic lenses are lightweight and possess excellent mechanical properties. Photochromic dyes are incorporated into certain lenses to enhance their optical properties by automatically lightening or darkening based on the amount and type of light that they receive. Since the photochromic dye molecules can decompose when exposed to the heat of the injection molding process, such dyes need to be introduced on to the lens after the injection molding step. One method is to incorporate the photochromic dye into a coating composition and apply it to a lens surface via dip coating or spin coating. The surface discontinuity of bifocal and trifocal segmented lenses are not well suited to these typical coating processes. The viscous coating material builds-up at the segment which results in an undesirable darker color at the segment when exposed to UV light. A prior art process utilizing a photochromic polyurethane coating is shown in U.S. Pat. Nos. 6,187,444 and 7,258,437. These approaches do not use organic peroxides in the coating compositions, rather they utilize condensation reactions.

Photochromic (PhCh) semi-finished straight-top (SFST) lenses can be made by injection molding polycarbonate (PC) behind a photochromic wafer. The wafer can be a tri-layer of PC/PhCh/PC. VisionEase U.S. Pat. No. 7,036,932 and U.S. Published Patent Application 2007/0122626 describes such a product.

Another method is to overmold a bifocal on top of a lens as described in U.S. Pat. No. 7,258,437. Generally, the overmold casting solution is not photochromic, as mentioned in U.S. Pat. No. 5,531,940, with the lens optionally containing photochromics. As described in U.S. Pat. No. 5,531,940 and JP Patent 2005-199683 the overmolding solution can contain photochromic materials and the lens can be non-photochromic, or a combination of the two. The overmold solution can be cured by either UV, thermal or a combination of each. With these ensembles the desirable high impact nature of the polycarbonate can be compromised because the overmold layer replaces a portion of the total lens thickness.

There is a need to make photochromic polycarbonate bifocal or trifocal segmented spectacle lenses with good photochromic performance.

With the current methods of depositing viscous urethane photochromic coatings as described in U.S. Pat. No. 7,189,456, it is extremely difficult, if not impossible, to produce a polycarbonate photochromic semi-finished segmented (bifocal or trifocal) optical lens. The viscous coating material will build-up at the segment which results in an undesirable darker color at the segment when exposed to UV light.

Another method is where a polycarbonate lens substrate is injection molded. The mold block opens and a few drops of a coating liquid are applied to the front surface of the polycarbonate lens. The mold block then closes. This serves two (2) purposes. First, when the mold block closes, it spreads the coating over the front (CX) surface of the polycarbonate lens to provide a uniform thickness. Secondly, the mold block will provide suitable heat to cure the coating formulation.

There is a need for a photochromic coating formulation and application method which will result in good lens transparency, a high level of photochromic performance, low yellow color and minimal photochromic fatigue.

SUMMARY OF THE INVENTION

It is therefore an object of the present invention to provide a photochromic coating which exhibits improved photochromic performance.

It is a further object to provide a photochromic coating with low yellow color.

It is another object to provide a coating that has minimal photochromic fatigue.

It is yet a further object to provide a photochromic coating which is suitable for use in an in-mold coating process.

It is another object to provide a suitably coated photochromic bifocal lens.

These and other related objects according to an embodiment of the invention are achieved by providing a thermally curable photochromic coating composition containing a blend of two or more acrylate-based monomers, a metal salt catalyst, a HALS, an antioxidant (AO), an initiator and a photochromic dye. The monomers are selected from: (a) monofunctional (meth)acrylate; (b) difunctional (meth)acrylate; (c) a combination of a monofunctional (meth)acrylate and a difunctional (meth)acrylate; (d) multifunctional (meth)acrylate; and (e) aliphatic urethane diacrylate. The metal salt is selected from a metal ester of 2-naphthoic acid, a metal ester of 2-ethylhexanoic acid, a metal ester of octoate material, and combinations thereof. The initiator is selected from t-amylperoxy-2-ethylhexyl carbonate organic peroxide and t-butylperoxy-2-ethylhexylcarbonate.

Suitable monofunctional (meth)acrylates are isobornylacrylate, hydroxypropylmethacrylate, benzyl acrylate, and combinations thereof. Suitable difunctional (meth)acrylates are polyethyleneglycol (600) dimethacrylate, ethoxylated (8) bisphenol A dimethacrylate, ethoxylated (10) bisphenyl A diacrylate, and ethoxylated (30) bisphenyl A dimethacrylate. Suitable multifunctional (meth)acrylates are hexafunctional aliphatic urethane acrylate and dipentaerythritol pentaacrylate. Suitable aliphatic urethane diacrylates are aliphatic polyester urethane diacrylate, aliphatic urethane diacrylate diluted with a reactive diluent 1,6-hexanediol diacrylate, aliphatic urethane diacrylate diluted with a reactive diluent isobornyl acrylate and combinations thereof. The antioxidant is a sterically hindered phenolic compound, for example pentaerythritol tetrakis[3-(3,5-di-tert-butyl-4-hydroxyphenyl)propionate]hindered phenolic compound. Suitable metal salts are tin-2-ethylhexanoate, bismuth carboxylate, and cobalt naphthenate. Suitable HALS are [4-(methoxyphenyl)-methylene]-bis-1,2,2,6,6-pentamethyl-4-piperidinyl-propanedioic acid ester and phenyl-(3,5-di-tert.butyl-4-hydroxybenzyl)-malonic acid-bis-(1,2,2,6,6-penta-methyl-4-piperidinyl)ester.

The monofunctional and difunctional (meth)acrylates are present in an amount from about 10% to about 25%. The multifunction a (meth)acrylates are present in an amount from about 20% to about 40%. The aliphatic urethane diacrylate is present in an amount from about 50% to about 70%, all by weight. The metal salt is present in an amount from 0.10 parts per hundred monomer (phm) to 0.30 phm. The HALS is present in an amount from 1.00 phm to 5.00 phm. The AO is present in an amount from 0.20 phm to 0.50 phm. The initiator is present in an amount from 1.00 phm to 2.00 phm, and the photochromic dye is presents in an amount from 1.00 phm to 5.00 phm.

Further objects according to another embodiment of the invention are achieved by a method for manufacturing an injection molded thermoplastic photochromic bifocal lens which includes initially providing an acrylate-based photochromic coating composition. The composition includes two different types of monomers, a metal catalyst selected from the group consisting of tin-2-ethylhexanoate, bismuth carboxylate, and cobalt naphthenate, an HALS, an antioxidant, an initiator and a photochromic dye. The composition can be formulated from various compounds described above, all of which are suitable for use in the manufacturing method.

Next molten thermoplastic is injected into an edge-gated bifocal-lens forming cavity of an injection molding machine to provide a bifocal lens substrate. The mold is opened at a time when the bifocal lens is rigid enough to retain its shape. The photochromic composition is applied onto the bifocal lens substrate. The mold is closed to spread the photochromic composition into a uniformly thin layer so that residual heat from the molding machine cures the photochromic composition into a coating with low photochromic fatigue. The photochromic coating is applied across a segmented surface of the bifocal lens to a thickness in the range from about 1 to about 10 μm. The photochromic fatigue is less than 15% and the % T dark is less than 16%.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENT

Figure 1:
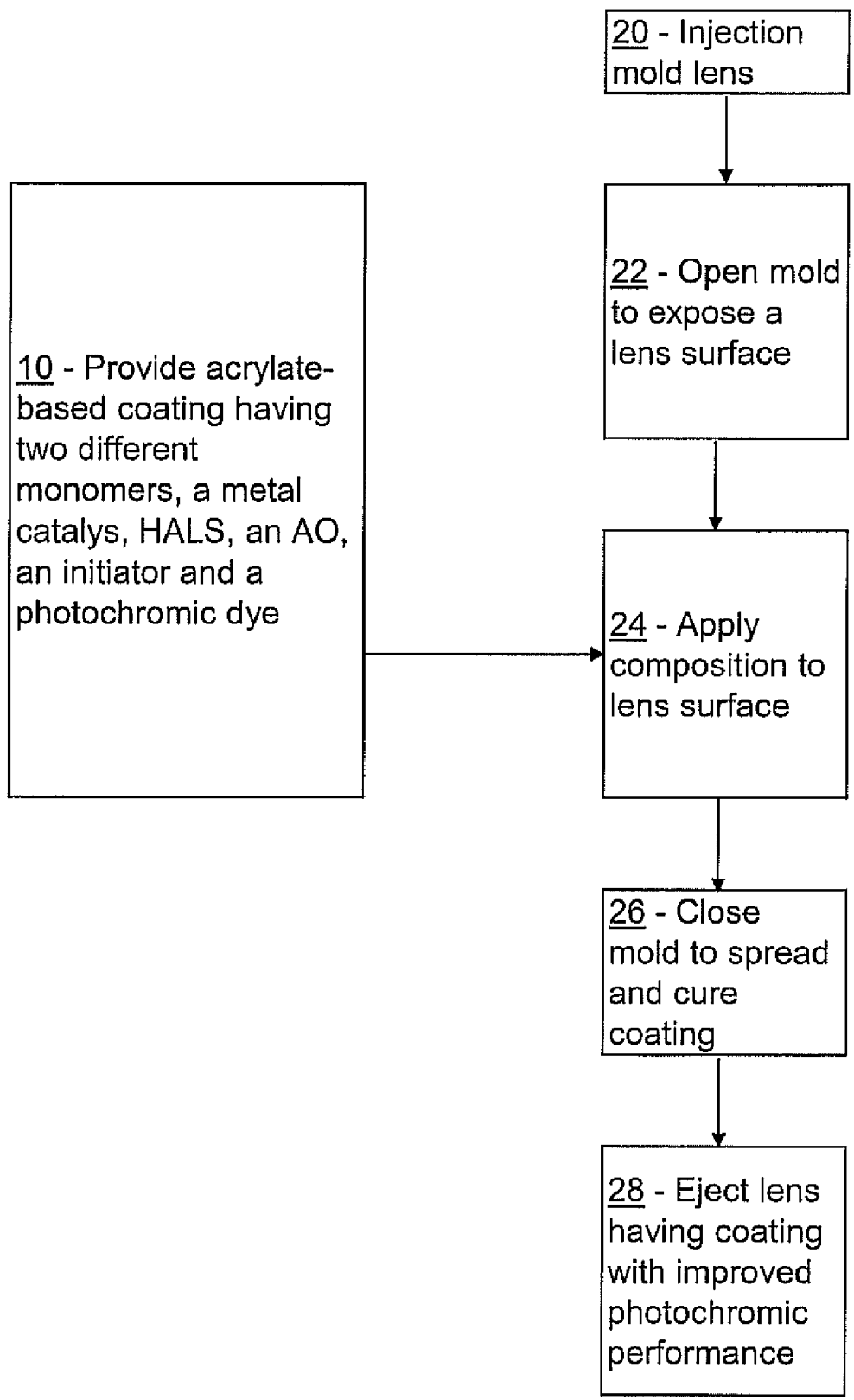
FIG. 1 is a flowchart showing various steps according to an embodiment of the coating method according to the invention.

Thermoplastic lenses must be extremely clean before they can be coated. In the regular lens coating process, after the lenses are taken out of mold and degated, they have to be transferred and go through several different cleaning tanks before being coated. The coatings often require heat or UV light in order to cure. The transfer, cleaning, coating and curing operations utilize vast amounts of space and have high power demands to operate conveyors, pumps, heaters and curing ovens. That adds to the cost of the finished product. Accordingly, it would be desirable to coat a lens soon after it is formed by injection molding. In contrast to the prior art, a lens can be coated in-mold within 1 or 2 minutes of initial environmental contact before ejection or degating, thereby eliminating those operations as contamination sources.

According to one embodiment of the invention, a photochromic coating formulation is provided. The coating formulation contains (1) a photochromic dye; (2) an antioxidant (AO); (3) a metal salt catalyst; (4) an initiator; (5) a hindered amine light stabilizer (HALS), and (6) a blend of monomers.

An embodiment of the lens coating process according to the invention will be characterized by the following steps. In the cooling stage of the lens molding, the mold will open for coating deposition. The mold can open as soon as the lens substrate is rigid enough to sustain mold opening. That is, the lens shape which determines the degree of aberration and power, will resist deformation under mold depressurization and vacuum forces. The coating is deposited as an unpressurized coating solution onto the lens substrate. The mold is reclamped to contact the coating with the upper mold insert and spread an even layer over the lens surface. The coating spread pressure is directed in exactly the same direction and manner as the lens forming clamp pressure. Once closed the coating is heated from below by the lens substrate, and from above by the mold insert. A 1-5 minute coating cure phase is provided while the lens achieves sufficient solidification to be ejected from injection molding machine.

For all examples, these thermally curable photochromic coating formulations were applied according to the post injection in-mold press coating process described above. It is preferred to obtain an optical article with high % T in the clear or noni-colored state, good darkening, low yellow, fast fade back (bleaching) and low photochromic degradation (fatigue).

Table 1 shows various formulations using Cytec Ebecryl monomers. Various catalysts such as Tin-2-ethylhexanoate. King Industries K-Kat 348 bismuth carboxylate and Cobalt-naphthenate are used. Hostavin PR-3 HALS or a HALS-1 is used with or without Ciba Irganox 1010 AO. Combinations of photochromic compounds that demonstrate a gray color (PC-A and PC-B) upon activation were used.

TABLE 1

| | | | | | | Cytec Ebecryl Formulations | | | | | | | | |
|---|---|---|---|---|---|---|---|---|---|---|---|---|---|---|
| Sample | Sn-2-EH | K-Kat 348 | Co—N | PR-31 | HALS-1 | Irg1010 | PC-A | PC-B | SR506 | HPMA | 284N | 1290 | 8411 | Trig 131 |
| 1 | 0.14 phm | | | | 1 phm | 0.25 phm | | 2.5 phm | 5% | 10% | 18% | 33% | 34% | 1.5 phm |
| 2 | 0.14 phm | | | 1 phm | | 0.25 phm | | 2.5 phm | 5% | 10% | 18% | 33% | 34% | 1.5 phm |
| 3 | | 0.27 phm | | 1 phm | | | 3.0 phm | | 5% | 10% | 18% | 33% | 34% | 1.5 phm |
| 4 | 0.14 phm | | | 1 phm | | 0.25 phm | 3.0 phm | | 5% | 10% | 18% | 33% | 34% | 1.5 phm |

TABLE 1-continued

Cytec Ebecryl Formulations

| Sample | Sn-2-EH | K-Kat 348 | Co—N | PR-31 | HALS-1 | Irg1010 | PC-A | PC-B | SR506 | HPMA | 284N | 1290 | 8411 | Trig 131 |
|---|---|---|---|---|---|---|---|---|---|---|---|---|---|---|
| 5 | | | 0.25 phm | | 1 phm | 0.25 phm | 3.0 phm | | 5% | 10% | 18% | 33% | 34% | 1.5 phm |

Sn-2-EH: Tin-2-ethylhexanoate catalyst (Aldrich).
K-Kat 348: Bismuth carboxylatye catalyst (King Industries).
Co—N: cobalt naphthenate catalyst (Aldrich).
Hostavin PR-31: Propandioic acid, [4-methoxyphenyl)-methylene]-, bis-1,2,2,6,6-pentamethyl-4-piperidinyl)ester (Clarient).
HALS-1: phenyl-(3,5-di-tert.butyl-4-hydroxy-benzyl)-malonic acid-bis-(1,2,2,6,6-penta-methyl-4-piperidinyl)ester prepared as described U.S. Pat. No. 4,198,334 at column 14, line 59 to column 21, line 29, which disclosure is incorporated herein by reference.
Irganox 1010: Pentaerythritol Tetrakis(3-(3,5-di-tert-butyl-4-hydroxyphenyl)propionate) hindered phenolic antioxidant (Ciba).
PC-A: combination of photochromic materials to give a gray color upon UV exposure included: 45 weight percent of an indeno-fused naphthopyran that exhibited a blue color when irradiated with ultraviolet light (UV); 35 weight percent of an indeno-fused naphthopyran that exhibited a blue-green color when irradiated with UV; and 20 weight percent of an indeno-fused naphthopyran that exhibited a yellow-brown color when irradiated with UV.
PC-B: combination of photochromic materials to give a gray color upon UV exposure included: 5 weight percent of an indeno-fused naphthopyran that exhibited a blue-purple color when irradiated with ultraviolet light (UV); 10 weight percent of indeno-fused naphthopyrans that exhibited a blue color when irradiated with ultraviolet light (UV); 35 weight percent of a different indeno-fused naphthopyran that exhibited a blue color when irradiated with ultraviolet light (UV); 27 weight percent of an indeno-fused naphthopyran that exhibited a green-gray color when irradiated with ultraviolet light (UV); 23 weight percent of an indeno-fused naphthopyran that exhibited a green color when irradiated with ultraviolet light (UV).
SR506: isobornylacrylate (Sartomer).
HPMA: hydroxypropylmethacrylate (Aldrich) a mixture of hydroxypropyl and hydroxyisopropyl methacrylates.
284N: Ebecryl 284-N aliphatic urethane diacrylate (Cytec) aliphatic urethane diacrylate diluted with a reactive diluent 1,6-hexanediol diacrylate.
1290: Ebecryl 1290 hexafunctional aliphatic urethane acrylate (Cytec).
8411: Ebecryl 8411 aliphatic urethane diacrylate (Cytec) aliphatic urethane diacrylate diluted with a reactive diluent isobornyl acrylate.
Triganox 131: tert-amylperoxy-2-ethylhexyl carbonate organic peroxide (Akzo).

Photochromic performance was measured using a Bench for Measuring Photochromics (BMP) optical bench made by Essilor, France, in accordance with the procedure disclosed in U.S. Pat. No. 7,320,826 at column 42, line 17 to column 43, line 30, except that the temperature dependence was not measured. Photochromic lenses are first conditioned (darkened then bleached) and initial transmission (Y) and color (a*, b*) is measured. The photochromic is activated using a UV light source. After 15 minutes, the transmission is measured (% Tdark). The UV light source is shut off and a visible light source is turned on and the photochromic bleaches over a period of time. The amount of time it takes to reduce optical density by 50% is recorded (T½). The transmission and color are continually monitored providing a darkening and fading rate and color diagram. Lenses are aged in a Weather-o-meter and the photochromic breakdown is monitored as % fatigue based on optical density loss and the change in yellow as Δb* in accordance with the procedure disclosed in U.S. Pat. No. 6,998,072 at column 33, line 49 to column 34, line 11, which disclosure is incorporated herein by reference.

Table 2 shows that formulas 1-5 are preferred as they provide very good bleach transmission, low yellow color, good darkening, good fade kinetics and low photochromic fatigue <15%.

TABLE 2

Ebecryl Formulation Results, 60 sec. cure unless noted

| Sample | Y | b* | % Tdark | T½ bleach | Fatigue | % Δb* | |
|---|---|---|---|---|---|---|---|
| 1 | 83.9 | 1.7 | 12.3 | 77 | 13.9 | 2.2 | |
| 2 | 82.7 | 1.7 | 13.2 | 89 | 14.4 | 3.3 | 120 sec cure |
| 3 | 81.5 | 1.6 | 14.8 | 60 | 10.8 | 3.7 | |
| 4 | 80.0 | 1.5 | 15.5 | 61 | 5.6 | 3.0 | 120 sec. cure |
| 5 | 81.7 | 2.0 | 14.8 | 59 | 7.7 | 3.3 | |

Table 3 shows various formulations using Sartomer monomers. Various catalysts such as Tin-2-ethylhexanoate, King Industries K-Kat 348 bismuth carboxylate and Cobalt-naphthenate are used. Hostavin PR-31 HALS or HALS-1 is used with or without Ciba Irganox 1010 AO. Combinations of photochromic compounds that demonstrate a gray color (PC-A and PC-B) upon activation were used.

TABLE 3

Sartomer Formulations

| Sample | Sn-2-EH | Co—N | HALS-1 | Irg1010 | PC-A | SR506 | BzA | HPMA | SR-399 | CN-965 | Trig 131 |
|---|---|---|---|---|---|---|---|---|---|---|---|
| 6 | | 0.20 phm | 1 phm | 0.50 phm | 3.0 phm | 1% | 21% | | 22% | 56% | 1.5 phm |
| 7 | | 0.25 phm | 1 phm | 0.50 phm | 3.0 phm | 1% | | 21% | 22% | 56% | 1.5 phm |
| 8 | 0.14 phm | | 1 phm | 0.25 phm | 2.5 phm | 1% | 15% | | 22% | 62% | 1.5 phm |

Sn-2-EH: Tin-2-ethylhexanoate catalyst
Co—N: cobalt naphthenate catalyst
HALS-1: previously described
Irganox 1010: Pentaerythritol Terakis(3-(3,5-di-tert-butyl-4-hydroxyphenyl)propionate) hindered phenolic antioxidant
PC-A: previously described
SR506: Sartomer isobornylacrylate monomer
BzA: Alpha Aesar Benzyl acrylate monomer
HPMA: Aldrich hydroxypropylmethacrylate monomer
SR-399: Sartomer dipentaerythritol pentaacrylate monomer
CN-965: Sartomer aliphatic polyester based urethane diacrylate oligomer
Trig 131: tert-Amylperoxy-2-ethylhexyl carbonate organic peroxide Table 4 shows that formulas 7 and 8 are preferred as they provide very good bleach transmission, low yellow color, good darkening, good fade kinetics and low photochromic fatigue <15%.

TABLE 4

Sartomer Formulation Results, 60 sec cure

| Sample | Y | b* | % Tdark | T½ bleach | % Fatigue | Δb* |
|---|---|---|---|---|---|---|
| 6 | 79.6 | 4.1 | 13.9 | 53 | 10.7 | 4.1 |
| 7 | 81.2 | 1.7 | 13.2 | 48 | 6.1 | 3.7 |
| 8 | 80.8 | 1.7 | 13.7 | 49 | 5.8 | 4.1 |

The organic peroxide radicals are necessary to accelerate monomer curing. However, the free radicals possess the potential to adversely interfere with other compounds within the coating. Antioxidants consume free radials. The formulations according to the invention surprisingly provide a balance between providing protection from the free radicals without substantially effecting the radicals function in the monomer curing process.

The inclusion of Tin-2-ethylhexanoate (Sn-2-EH) as catalyst represents an improvement because it is provided in a colorless liquid. Some other metal catalysts require colored or oil-based solvents, which can cause problems in optical applications. The Sn-2-EH resists coalescing and is able to dissolve in the coating monomers.

Furthermore, the formulations described herein are suitable for use in a post injection in-mold press coating process. To summarize, the coating formulations are based on the following combination of ingredients:
Photochromic materials
Antioxidant (AO)
Metal salt
Initiator
Hindered amine light stabilizer
Monomers comprising at least one monofunctional (meth)acrylate and one multifunctional (meth)acrylate.

As can be seen from the test results, the various embodiments of the acrylate based coating formulations provide numerous benefits. The formulations provide excellent photochromic performance. In a preferred embodiment, the improved photochromic performance is combined with a segmented bifocal lens made from polycarbonate. The formulation can be utilized in a post-injection in mold press coat lens process. This represents an increase in efficiency over conventional coating methods. The formulation can be employed in an industrial molding and coating process as will discussed further below.

As can be seen in the flowchart of FIG. 1, step 10 in the left column relates to formulating the coating composition, which will be discussed in greater detail below. The right column relates to steps performed by, or with, the injection molding machine. The process is commenced with the closing of the mold, injecting resin in step 20 to provide a lens substrate, and optionally applying packing pressure. During this injection stage, a primary clamp force of about 100 tons or more is utilized. Once the lens is rigid enough to sustain mold opening, the mold is opened, in step 22. Mold opening constitutes an upward vertical retraction of the movable side of the mold. This initial phase is conventional for injection molded lenses, for example, as described in U.S. Published Patent Application 2007/0138665. The substrate that could be used in this method could be any injection moldable lens material like PMMA, polycarbonate, polycarbonate/polyester blend, polyamide, polyurethane, polysulfone, cyclic olefin co-polymers, polystyrene. etc. In a preferred embodiment the substrate is polycarbonate.

The injecting step provides an afocal lens substrate, a single vision lens substrate, a multifocal lens, a bifocal lens substrate, a bifocal straight-top lens substrate, a trifocal lens substrate, a trifocal straight-top lens substrate, or a progressive lens substrate.

One lens surface, for example the convex side, is exposed and facing upward. In step 24, the coating composition is applied to the exposed lens surface. The composition may be applied in a single, unpressurized charge, for example by a metering syringe mounted on a retractable arm that moves in between the open mold blocks. For lenses of all powers and configurations, the coating may be applied onto, or near, the center of the lens, off-center or at various locations. The lenses will all generally have a circular outer perimeter. One or more syringes may be employed to deposit coating composition, if the mold has 2, 4, or more lens molding cavities. After application of the composition and removal of the syringe, the movable mold half closes in step 26 to spread the coating across the entire upper lens surface. The coating is spread radially outwardly from the center, or near the center, of the lens, out to the circular periphery. During this cure stage, a secondary clamp force, less than or equal to the primary clamp force may be utilized. After the coating is cured, and the lens has solidified sufficiently, the mold is opened and the cured coated lens is ejected in step 28. The in-mold process is particularly well suited for coating a segmented bifocal lens. By re-clamping the mold to spread the coating, a uniformly thin layer is achieved and rapidly cured in situ. A high degree of mold replication assures that coating does not build up at the surface discontinuity. Coating build-up is a long standing problem when attempting to add a photochromically enabled coating to a segmented, bifocal lens.

In a preferred embodiment, the photochromic materials are present in an amount of from 2.0 to 4.0 phm, and preferentially of 2.5 phm. The preferred Antioxidant is Irganox 1010, and is present in an amount of 0.25 phm. The metal salt catalyst is either Sn-2-EH, Co-naphthenate or K-Kat348, and is present in an amount of 0.2 phm. The initiator is t-amylperoxy-2-ethylhexyl carbonate organic peroxide or t-butylperoxy-2-ethylhexylcarbonate. In a preferred embodiment, the initiator is Trig 131 (t-amylperoxy-2-ethylhexyl carbonate organic peroxide, present in an amount of 1.5 phm. The HALS is phenyl-(3,5-di-tert.butyl-4-hydroxy-benzyl)-malonic acid-bis-(1,2,2,6,6-penta-methyl-4-piperidinyl)ester or Hostavin PR-31. The preferred HALS is phenyl-(3,5-di-tert-.butyl-4-hydroxy-benzyl)-malonic acid-bis-(1,2,2,6,6-penta-methyl-4-piperidinyl)ester present in an amount of 1 phm.

The monomer blend comprises a mixture of at least two different monofunctional (meth)acrylate monomer and/or difunctional meth(acrylate) monomer selected from isobornylacrylate monomer (SR506), 2-hydroxypropyl-methacrylate monomer (HPMA), benzyl acrylate monomer (BzA), polyethyleneglycol (600) dimethacrylate (SR252), ethoxylated (8) bisphenol A dimethacrylate (CD542), ethoxylated (10) bisphenyl A diacrylate (SR602), and ethoxylated (30) bisphenyl A dimethacrylate (SR9036), polyethyleneglycol (400) diacrylate (SR344), polyethyleneglycol (400) dimethacrylate (SR603), polyethyleneglycol (600) diacrylate (SR610), ethoxylated (4) bisphenol A diacrylate (SR6 (1), ethoxylated (4) bisphenol A dimethacrylate (SR540), ethoxylated (6) bisphenol A dimethacrylate (SR541), ethoxylated (10) bisphenyl A dimethacrylate (SR480), ethoxylated (30) bisphenyl A diacrylate (CD9038). The monomers from this category are present in an amount of 15% by weight.

Additionally, the monomer blend includes one multifunctional (meth)acrylate monomer selected from hexafunctional aliphatic urethane acrylate (Ebecryl 1290) and dipentaerythritol pentaacrylate monomer (SR399), (present in an amount of 33% by weight) and at least one aliphatic urethane diacrylate selected from Ebecryl 284N, Ebecryl 8411, and CN965 (present in an amount of 52% by weight).

The catalyst is a metal ester chosen from a large range of organic acid esters including alkane esters such as acetates, heptanoates, hexanoates, octoates, decanoates, oleates, stearates, oxalates, salicylates, linoleates and lactates. Aromatic esters such as naphthenates. Other non-limiting examples of suitable metal esters include bismuth naphthenate, calcium naphthenate, calcium octoate, cerium octoate, chromium octoate, cobalt octoate, copper naphthenate, copper octoate, ferric octoate, lead naphthenate, lead octoate, lithium neodecanoate, manganese naphthenate, manganese octoate, molybdenum naphthenate, molybdenum octoate, nickel octoate, potassium octoate, sodium naphthenate, sodium octoate, strontium octoate, vanadium naphthenate, vanadium octoate, Yttrium octoate, zinc naphthenate, zinc octoate and zirconium octoate. Metal salts are also known as soaps.

A preferred metal salt is Tin octoate (2-ethylhexanoate) which comes as a pure liquid with light straw yellow color and devoid of solvent, which makes it desirable for demanding optical coating applications. Another family organotins (tin-carbon bonds) used as catalysts are hydrated monobutyltin oxides which can include butyl chlorotin dihydroxide, butyltin tris (2-ethylhexoate), dibutyltin diacetate, dibutyltin oxide, dibutyltin dilaurate, dibutyltin dichloride, dibutyltin distearate, butyl stannoic acid, dioctyltin dilaurate and dioctyltin maleate, inter alia. A preferred metal salt is tin-2-ethylhexanoate, bismuth carboxylate, or cobalt naphthenate.

Antioxidants (AO) which are suitable for use in the coating according to the invention are described below. The preferred antioxidant is Irganox 1010.

Irganox 1010: Pentaerythritol Tetrakis(3-(3,5-di-tert-butyl4-hydroxyphenyl)propionate)
Family: sterically hindered phenolic
100%, white powder

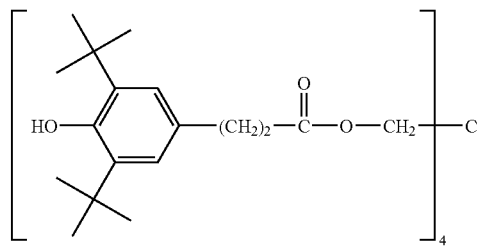

IRGANOX 1010

Irganox 1098: diamide derivative, N,N'-hexane-1,6-didiyl-bis(3,5-di-tert-butyl-4-hydroxyphenylpropionamide))
Family: sterically hindered phenolic
100%, white powder

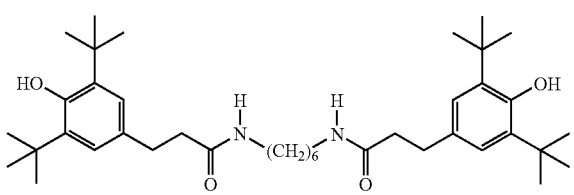

IRGANOX 1098

Irganox 245: Ethylenebis(oxyethylene)bis-(3-(5-tert-butyl-4-4-hydroxy-m-tolyl)-propionate)
Family: sterically hindered phenolic
50%-100%, white powder

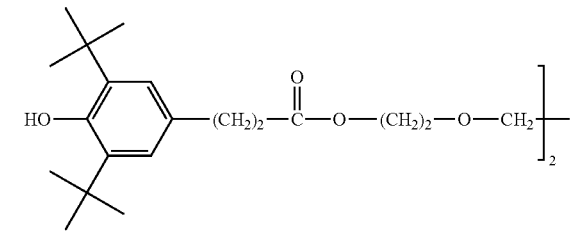

IRGANOX 245

The HALS (Hindered Amine light Stabilizer) which are suitable for use in the coating formulations possess hindered phenolic antioxidant properties. The preferred HALS is phenyl-(3,5-di-tert.butyl-4-hydroxy-benzyl)-malonic acid-bis-(1,2,2,6,6-penta-methyl-4-piperidinyl)ester. These compounds are described more fully in U.S. Pat. No. 4,198,334. Surprisingly, it was discovered that the (a) choice of photochromic material and concentration, (b) in combination with the choice of HALS and (c) in further combination with the choice of the monomer system (Ebecryl) is very important to improve the photochromic level and properties of the lens in term of % T dark, % T bleach, photochromic fatigue and yellow residual color.

The photochromic materials can include the following classes of photochromic compounds: chromenes, e.g., naphthopyrans, benzopyrans, indenonaphthopyrans, phenanthropyrans or mixtures thereof; spiropyrans, e.g., spiro(benzindoline)naphthopyrans, spiro(indoline)benzopyrans, spiro (indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; fulgides, fulgimides and mixtures of such photochromic compounds.

Non-limiting examples of chromenes are described in U.S. Pat. No. 5,458,814 at column 2, line 18 to column 9, line 5; U.S. Pat. No. 5,645,767 at column 2, line 16 to column 11, line 67; U.S. Pat. No. 5,656,206 at column 2, line 5 to column 13, line 50; U.S. Pat. No. 5,658,501 at column 2, line 5 to column 11, line 31; U.S. Pat. No. 5,698,141 at col. 2, line 11 to col. 19, line 19; U.S. Pat. No. 5,723,072 at column 2, line 27 to column 15, line 4; U.S. Pat. No. 6,022,497 at col. 2, line 21 to col. 10, line 60; U.S. Pat. No. 6,113,814 at column 2, line 23 to Column 23, line 29; U.S. Pat. No. 6,153,126 at column 2, line 26 to column 8, line 8; U.S. Pat. No. 6,296,785 at column 2, line 55 to column 30, line 27; U.S. Pat. No. 6,340,766 at column 3, line 12 to column 13, line 19; U.S. Pat. No. 6,348,604 at column 3, line 35 to column 16, line 37; U.S. Pat. No. 6,353,102 at column 2, line 3 to column 11, line 7; U.S. Pat. No. 6,555,028 at column 2, line 40 to column 24, line 55; U.S. Pat. No. 7,342,112 at column 2, line 38 to column 78, line 13; U.S. Pat. No. 7,465,415 at column 8, line 58 to column 74, line 64; U.S. Pat. No. 7,527,754 at column 2, line 65 to column 16, line 10; U.S. Patent Publication 2006/0228557 at paragraph [0007] to [0115]; U.S. Patent Publication 2007/0138449 at paragraph [0010] to [0101]; and U.S. Patent Publication 2008/0103301 at paragraph [0007] to [0115]. The disclosures of the aforementioned patents on chromene photochromic materials are incorporated herein by reference.

Non-limiting examples of spiropyrans are described in U.S. Pat. No. 4,931,220 at column 11, line 66 to column 13, line 20; U.S. Pat. No. 5,236,958 at column 1, line 43 to column 7, line 43; and U.S. Pat. No. 5,252,742 at column 1, line 45 to column 6, line 60. The disclosures of the aforementioned patents on spiropyrans are incorporated herein by reference. Spiro(indoline)pyrans are also described in the text. Techniques in Chemistry, Volume III, "Photochromism", Chapter 3, Glenn H. Brown, Editor, John Wiley and Sons, Inc., New York, 1971.

Non-limiting examples of oxazines are described in U.S. Pat. No. 4,637,698 at column 1, line 40 to column 2, line 23; U.S. Pat. No. 4,931,219 at column 1, line 45 to column 7, line 9; U.S. Pat. No. 5,166,345 at column 3, line 36 to column 7, line 42; and U.S. Pat. No. 5,821,287 at column 3, lines 7 to 51. The disclosures of the aforementioned patents on oxazines are incorporated herein by reference.

Non-limiting examples of fulgides and fulgimides arc disclosed in U.S. Pat. No. 4,685,783 at column 1, line 57 to column 5, line 27; U.S. Pat. No. 4,931,220 at column 21, line 39 to column 22, line 40; and U.S. Pat. No. 5,359,085 at column 5, line 26 to column 19, line 45. The disclosures of the aforementioned patents oil fulgides and fulgimides are incorporated herein by reference.

The photochromic materials described herein can be chosen from a variety of non-limiting examples which include: of course, a single photochromic compound; a mixture of photochromic compounds; a material comprising at least one photochromic compound, such as a plastic polymeric resin or an organic monomeric or oligomeric solution; a material such as a monomer or polymer to which at least one photochromic compound is chemically bonded; a material comprising and/or having chemically bonded to it at least one photochromic compound, the outer surface of the material being encapsulated (encapsulation is a form of coating), for example with a polymeric resin or a protective coating such as a metal oxide that prevents contact of the photochromic material with external materials such as oxygen, moisture and/or chemicals that have a negative effect on the photochromic material, such materials can be formed into a particulate prior to applying the protective coating as described in U.S. Pat. Nos. 4,166,043 and 4,367,170; a photochromic polymer, e.g., a photochromic polymer comprising photochromic compounds bonded together; or mixtures thereof.

The above description provides general guidelines and specific formulations for acrylate-based photochromic coating compositions. The compositions result in coatings having low yellowness and high photochromic performance for thermoplastic lenses. The composition is well suited for use in a post-injection in-mold press coating process, where the mold is used to spread the composition into a uniformly thin layer across the convex surface of the lens. This process uses the residual heat from the molten thermoplastic and the mold to cure the composition into a solid, abrasion resistant coating. The in-mold process also allows the coating to achieve a high degree of conformity to the surface of bifocals, at the segment ridge. References to segmented lenses and multifocal lens means lenses having a ridge, which we also refer to as a lens surface discontinuity. These segmented lenses are also referred to as straight-to bifocal lenses. These factors allow photochromic bifocal lens to be efficiently manufactured. Throughout the specification there are parenthetical references to (meth)acrylates. This notation refers to, and includes, the acrylate compound or the corresponding methacrylate version.

Having described preferred embodiments for lens manufacturing, materials used therein for coatings and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A thermally curable photochromic coating composition comprising:
   a mixture having two different monomers, where the monomers are selected from the group consisting of: (a) monofunctional (meth)acrylate; (b) difunctional (meth)acrylate; (c) a combination of a monofunctional (meth)acrylate and a difunctional (meth)acrylate; (d) multifunctional (meth)acrylate; and (e) aliphatic urethane diacrylate;
   a metal salt selected from the group consisting of a metal ester of 2-naphthoic acid, a metal ester of 2-ethylhexanoic acid, a metal ester of octoate material, and combinations thereof;
   a Hindered Amine Light Stabilizer (HALS);
   an antioxidant;
   an initiator selected from the group consisting of t-amylperoxy-2-ethylhexyl carbonate organic peroxide and t-butylperoxy-2-ethylhexylcarbonate; and
   a photochromic dye.

2. The photochromic coating composition of claim 1, wherein the monofunctional (meth)acrylate is selected from the group consisting of isobornylacrylate, hydroxypropylmethacrylate, benzyl acrylate, and combinations thereof.

3. The photochromic coating composition of claim 1, wherein the difunctional (meth) acrylate is selected from the group consisting of polyethyleneglycol (600) dimethacrylate, ethoxylated (8) bisphenol A dimethacrylate, ethoxylated (10) bisphenyl A diacrylate, and ethoxylated (30) bisphenyl A dimethacrylate.

4. The photochromic coating composition of claim 1, wherein the multifunctional (meth)acrylate is selected from the group consisting of hexafunctional aliphatic urethane acrylate and dipentaerythritol pentaacrylate.

5. The photochromic coating composition of claim 1, wherein the aliphatic urethane diacrylate is selected from the group consisting of aliphatic polyester urethane diacrylate, aliphatic urethane diacrylate diluted with a reactive diluent 1,6-hexanediol diacrylate, aliphatic urethane diacrylate diluted with a reactive diluent isobornyl acrylate and combinations thereof 6. The photochromic coating composition of claim 1, wherein the antioxidant is a sterically hindered phenolic compound.

7. The photochromic coating composition of claim 6, wherein the antioxidant is a pentaerythritol tetrakis [3 -(3,5 -di-tert-butyl-4-hydroxyphenyl)propionate]hindered phenolic compound.

8. The photochromic coating composition of claim 1, wherein the metal salt is selected from the group consisting of tin-2-ethylhexanoate, bismuth carboxylate, and cobalt naphthenate.

9. The photochromic coating composition of claim 1, wherein the HALS is selected from the group consisting of [4-(methoxyphenyl)-methylene]-bis-1,2,2,6,6-pentamethyl-4-piperidinyl-propanedioic acid ester and phenyl-(3,5-di-tert.butyl-4-hydroxy-benzyl)-malonic acid-bis-(1,2,2,6,6-penta-methyl-4-piperidinyl)ester.

10. The photochromic coating composition of claim 1, wherein:
the monomers of (a) monofunctional (meth)acrylate; (b) difunctional (meth)acrylate; and
(c) a combination of a monofunctional (meth)acrylate and a difunctional (meth)acrylate are present in an amount from 10% to 25% by weight;
the monomers of (d) multifunctional (meth)acrylate are present in an amount from 20% to 40% by weight;
the monomers of (e) aliphatic urethane diacrylate are present in an amount from 50% to 70% by weight;
the metal salt is present in an amount from 0.10 phm to 0.30 phm;
the Hindered amine light stabilizer (HALS) is present in an amount from 1.00 phm to 5.00 phm;
the antioxidant is present in an amount from 0.20 phm to 0.50 phm;
the initiator is present in an amount from 1.00 phm to 2.00 phm; and
the photochromic dye is presents in an amount from 1.00 phm to 5.00 phm.

11. The photochromic coating composition of claim 1, wherein the monomer of (a) monofunctional (meth)acrylate comprises a mixture of isobornyl acrylate in an amount from 1% to 5% by weight and benzyl acrylate or 2-hydroxypropylmethacrylate in an amount from 10% to 21%.

12. The photochromic coating composition of claim 1, wherein
the mixture of monomers comprises isobornylacrylate present in an amount of 5% by weight, hydroxypropylmethacrylate present in an amount of 10% by weight, aliphatic urethane diacrylate present in an amount of 18% by weight, hexafunctional aliphatic urethane acrylate present in an amount of 33% by weight, and aliphatic urethane diacrylate present in an amount of 34% by weight;
the metal salt comprises tin-2-ethylhexanoate present in an amount of 0.14 phm;
the Hindered amine light stabilizer (HALS) is selected from the group consisting of [4-(methoxyphenyl)-methylene]-bis-1,2,2,6,6-pentamethyl-4-piperidinyl-propanedioic acid ester and phenyl-(3,5-di-tert.butyl-4-hydroxy-benzyl)-malonic acid-bis-(1,2,2,6,6pentamethyl-4-piperidiny)ester present in an amount of 1 phm;
the antioxidant comprises pentaerythritol tetrakis[3-(3,5-di-tert-butyl-4-hydroxyphenyl)propionate]hindered phenolic compound present in an amount of 0.25 phm;
the initiator comprises t-amylperoxy-2-ethylhexyl carbonate organic peroxide present in an amount of 1.5 phm; and
the photochromic dye is present in an amount of 2.0 phm to 4.0 phm.

* * * * *